US009354087B2

(12) United States Patent
Augustyniak et al.

(10) Patent No.: US 9,354,087 B2
(45) Date of Patent: May 31, 2016

(54) SINGLE TRACK THREE-CHANNEL ENCODER WITH DIFFERENTIAL INDEX

(71) Applicant: Avago Technologies General IP (Singapore) Pte. Ltd., Singapore (SG)

(72) Inventors: Marcin Kamil Augustyniak, Regensburg (DE); Aun Choon Chong, Penang (MY); Kek Leong Yap, Penang (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 406 days.

(21) Appl. No.: 13/737,756

(22) Filed: Jan. 9, 2013

(65) Prior Publication Data

US 2014/0191119 A1    Jul. 10, 2014

(51) Int. Cl.
*G01D 5/34* (2006.01)
*G01D 5/347* (2006.01)

(52) U.S. Cl.
CPC .................................. *G01D 5/34715* (2013.01)

(58) Field of Classification Search
CPC .................................................. G01D 5/34715

USPC ......................................... 250/231.13–231.18
See application file for complete search history.

(56) References Cited

U.S. PATENT DOCUMENTS

| 4,451,731 | A |   | 5/1984  | Leonard |
|-----------|---|---|---------|---------|
| 4,691,101 | A |   | 9/1987  | Leonard |
| 5,148,020 | A |   | 9/1992  | Machida |
| 5,241,172 | A |   | 8/1993  | Lugaresi |
| 5,530,242 | A | * | 6/1996  | Genovese ...................... 250/234 |
| 5,998,784 | A |   | 12/1999 | Venugopal et al. |
| 7,400,269 | B2 |  | 7/2008  | Wong et al. |
| 7,507,950 | B2 |  | 3/2009  | Wong et al. |
| 8,173,950 | B2 |  | 5/2012  | Thor et al. |
| 2008/0111061 | A1 | * | 5/2008  | Wong et al. .............. 250/231.13 |
| 2009/0206244 | A1 | * | 8/2009  | Bahari et al. .............. 250/231.13 |
| 2012/0205528 | A1 |  | 8/2012  | Augustyniak et al. |

* cited by examiner

*Primary Examiner* — Thanh Luu

(57) ABSTRACT

An optical encoder is disclosed. Specifically, a three-channel encoder is disclosed which utilizes a single track for all three channels. An index channel is provided on the same optical track as the first and second channels which are used to determine incremental angular position. Thus, a more compact and simple three-channel encoder is provided.

18 Claims, 8 Drawing Sheets

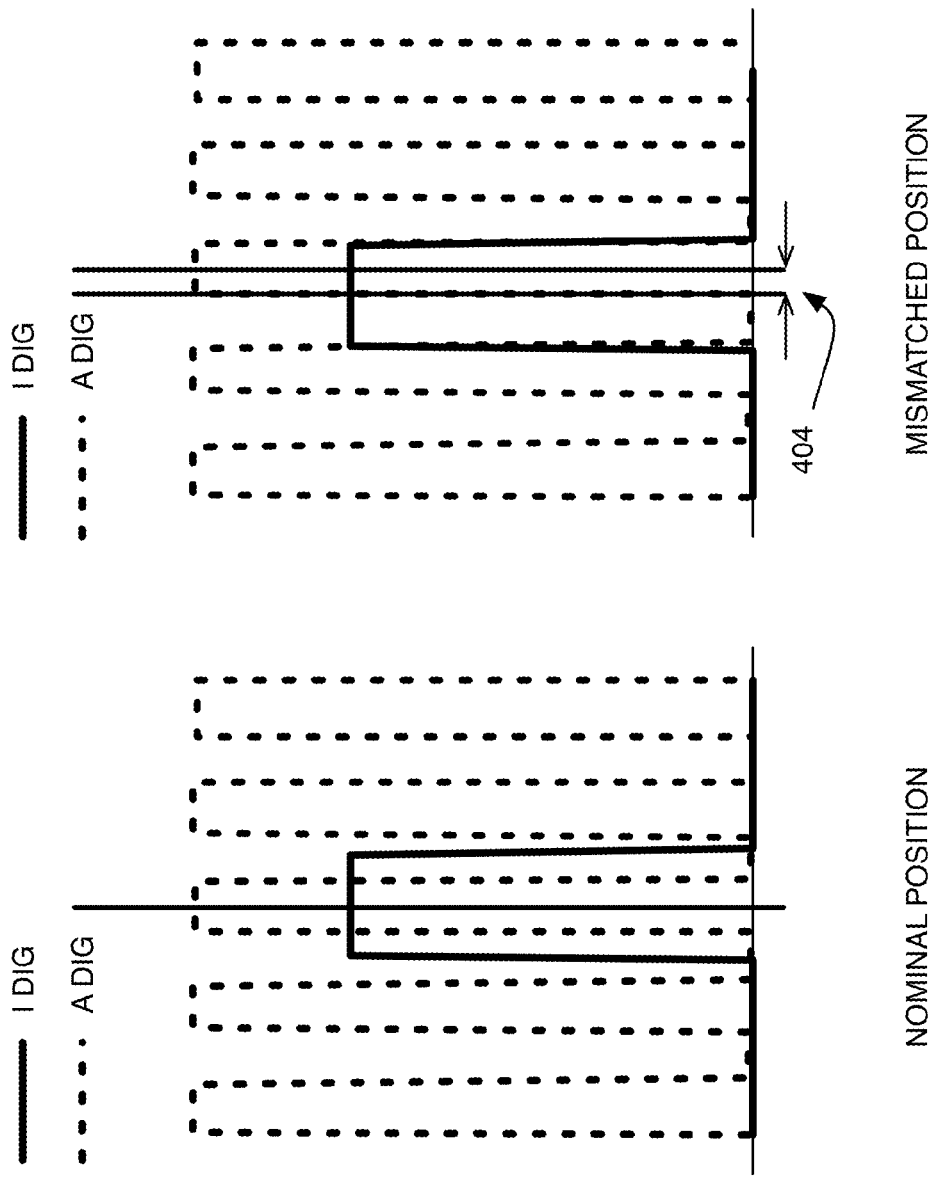

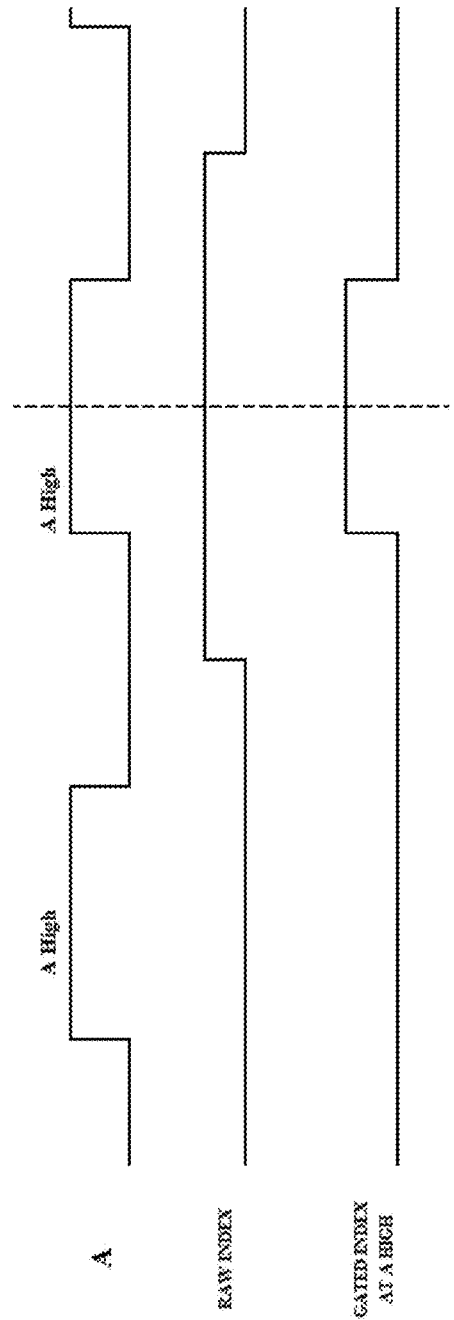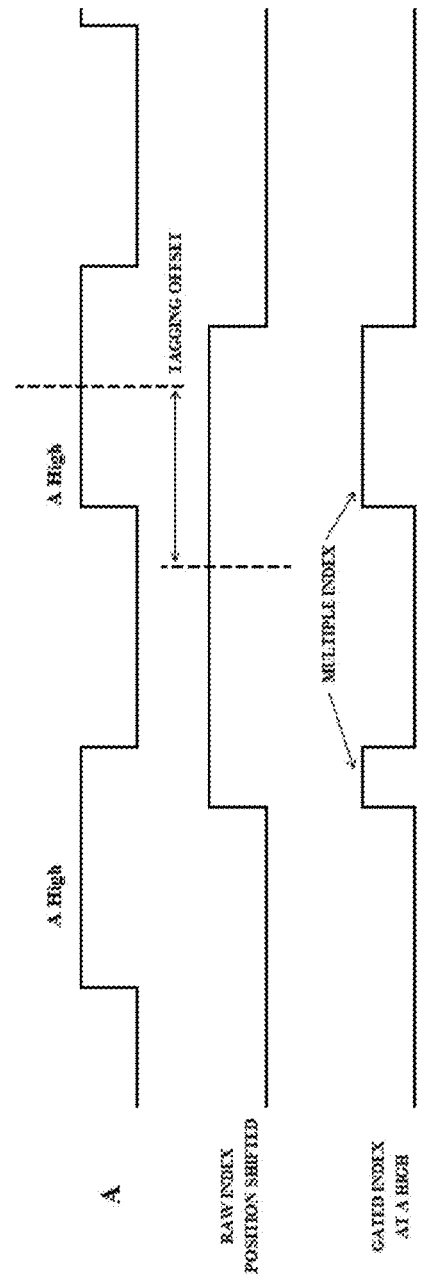

__US 9,354,087 B2__

SINGLE TRACK THREE-CHANNEL ENCODER WITH DIFFERENTIAL INDEX

FIELD OF THE DISCLOSURE

The present disclosure is generally directed toward encoders and more specifically toward optical encoders.

BACKGROUND

A rotary encoder, also called a shaft encoder, is an electromechanical device that converts the angular position of a shaft or axle to an analog or digital code, making it an angular transducer. Rotary encoders are used in many applications that require precise shaft unlimited rotation—including industrial controls, robotics, special purpose photographic lenses, computer input devices (such as opto-mechanical mice and trackballs), printers, and rotating radar platforms. There are two main types of rotary encoders: absolute and incremental (relative).

An incremental rotary encoder, also known as a quadrature encoder or a relative rotary encoder, traditionally has two outputs called quadrature outputs. These two outputs can be either mechanical or optical. In the optical type, there are traditionally two bar-window coded tracks, while the mechanical type has two contacts that are actuated by cams on the rotating shaft. Optical incremental encoders traditionally employ two outputs called A & B, which are called quadrature outputs, as they are 90 degrees out of phase.

A variation on the incremental encoder is the sinewave encoder. Instead of producing two quadrature square waves, the outputs are quadrature sine waves (a Sine and a Cosine). By performing the arctangent function, arbitrary levels of resolution can be achieved.

A typical two-channel incremental encoder generates at its output two chains of pulses shifted by 90 degrees. By counting pulses and checking the phase between the pulses (1st channel leading 2nd or vice versa), it is possible to determine the speed and direction of rotation. A significant improvement to a two-channel incremental encoder is a three-channel incremental encoder. The extra channel is index: once per revolution a pulse is generated, it serves as zero position reference so that incremental angular position might be then calculated.

The optical system for a two-channel incremental encoder is simplified by the fact that only one track (pattern of bars and windows) on the code wheel is enough. A straight forward implementation of a three-channel encoder would call for a second track on the code wheel indicating index. Unfortunately, introducing the second track required bigger area and hence constrains an optical system projecting code wheel pattern on the sensor area. This is a problem especially in a reflective encoder, whereby smaller size is preferred.

SUMMARY

A three-channel incremental encoder having all three channels on a single optical track was developed to overcome the above-noted shortcomings and is described in U.S. Patent Publication No. 2012/0205528 to Augustyniak et al., the entire contents of which are hereby incorporated herein by reference. Embodiments of the present disclosure provide further improvements to a three-channel encoder having all three channels on a single optical track.

In particular, embodiments of the present disclosure provide a single track three-channel encoder with a differential index. In particular, the encoder is provided with an additional window for index on the code wheel or code strip of the encoder. The additional window is used to generate an additional index signal (referred to herein as "I/" as opposed to the original index signal "I" that is generated away from the additional window). The processing of both I and I/ (e.g., according to the following equation $[I-(I/)]$) affords the generation of a differential index signal which is less sensitive to a misaligned code wheel or code strip.

In some embodiments, a code wheel or code strip for an encoder is provided for a three-channel encoder having all three channels aligned in a single optical track. More specifically, the code wheel or code strip described herein includes at least one additional window (or "index window") having a width that substantially corresponds to at least two times the width of a non-index bar or window on the code wheel or code strip. Even more specifically, the index window has a width of at least three times the width of a non-index bar or window on the code wheel or code strip. In some embodiments, a distance between the index window and an index bar is substantially equal to a distance between a center of first index photodiode and a center of a second index photodiode of the encoder's Integrated Circuit (IC).

For simplicity, while most embodiments are described herein with respect to a linear system, it should be appreciated that embodiments of the present disclosure are not so limited. Specifically, the concepts disclosed herein can be applied to both rotary and linear encoders or rotary or linear systems. In other words, a code wheel or code strip may be configured with one or more features disclosed herein. Moreover, although embodiments of the present disclosure are primarily described in connection with reflective encoders, it should be appreciated that any type of encoder can incorporate one or more of the features disclosed herein. For example, the concepts disclosed herein can be incorporated into an incremental encoder for three channels, a reflective encoder for three channels, a transmissive-type encoder, or combinations thereof.

The present disclosure will be further understood from the drawings and the following detailed description. Although this description sets forth specific details, it is understood that certain embodiments of the invention may be practiced without these specific details. It is also understood that in some instances, well-known circuits, components and techniques have not been shown in detail in order to avoid obscuring the understanding of the invention.

BRIEF DESCRIPTION OF THE DRAWINGS

The present disclosure is described in conjunction with the appended figures:

FIG. 4A depicts a wave diagram of an A-channel and index channel output by the photodiode array of FIG. 3 in normal alignment;

FIG. 4B depicts a wave diagram of an A-channel and index channel output by the photodiode array of FIG. 3 when the code wheel or code strip is misaligned relative to the photodiode array;

FIG. 6A depicts an encoder output during normal alignment conditions;

FIG. 6B depicts an encoder output during misalignment conditions;

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Figure 1:
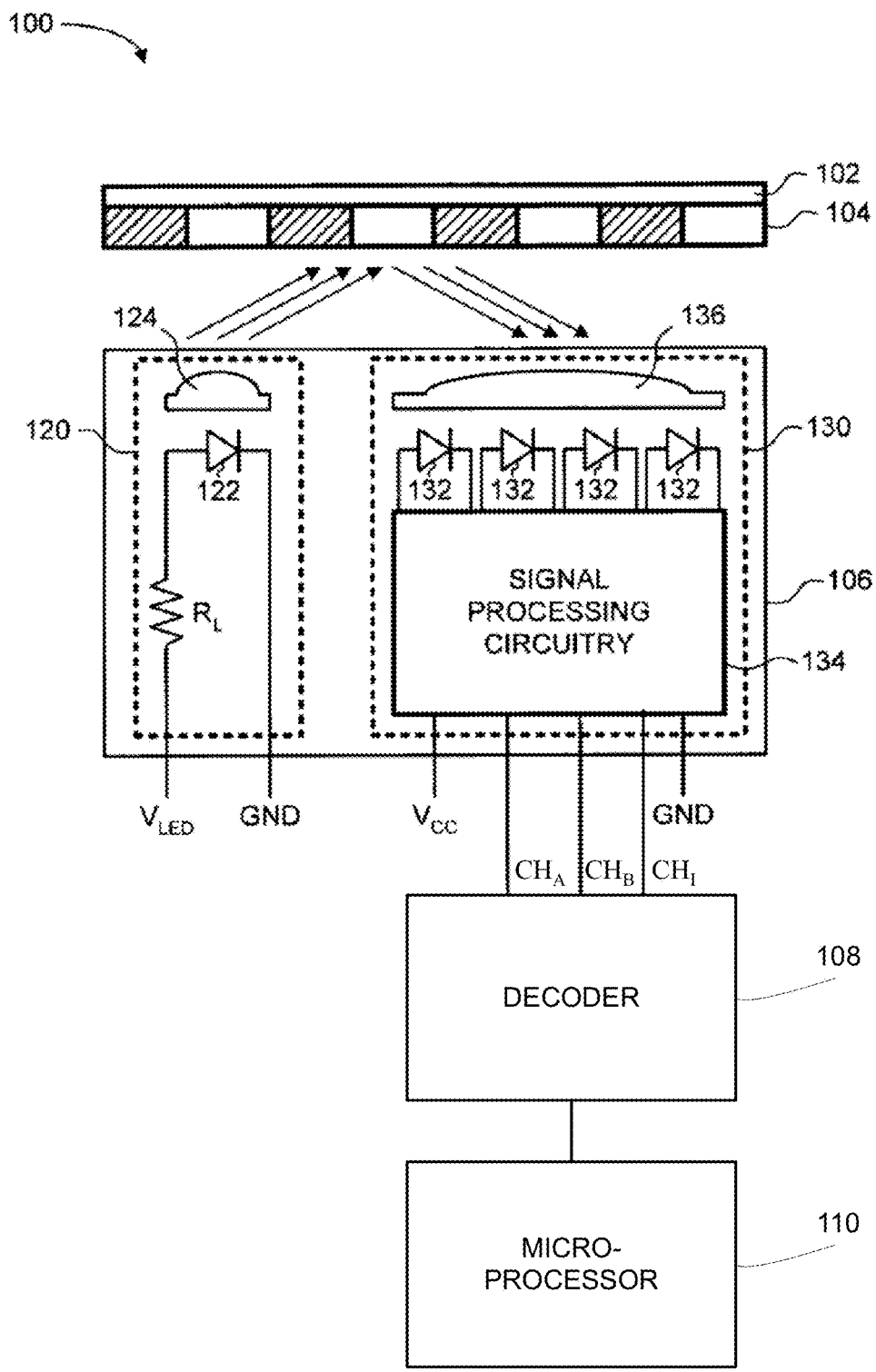
FIG. 1 is block diagram depicting components of an optical encoding system in accordance with embodiments of the present disclosure.

Referring now to FIG. 1, components of a reflective optical encoding system 100 will be described in accordance with embodiments of the present disclosure. The illustrated reflective optical encoding system 100 includes a reflective material 102, a code wheel 104, an encoder 106, a decoder 108, and a micro-processor 110. In one embodiment, the reflective material 102 is a coating or a substrate that is physically coupled to the code wheel 104. In some embodiments, the reflective surface of the reflective material 102 is coupled to the code wheel 104 opposite the encoder 106. In some embodiments, the reflective material 102 is deposited onto the code wheel 104 using any type of known material deposition technique.

Figure 2:
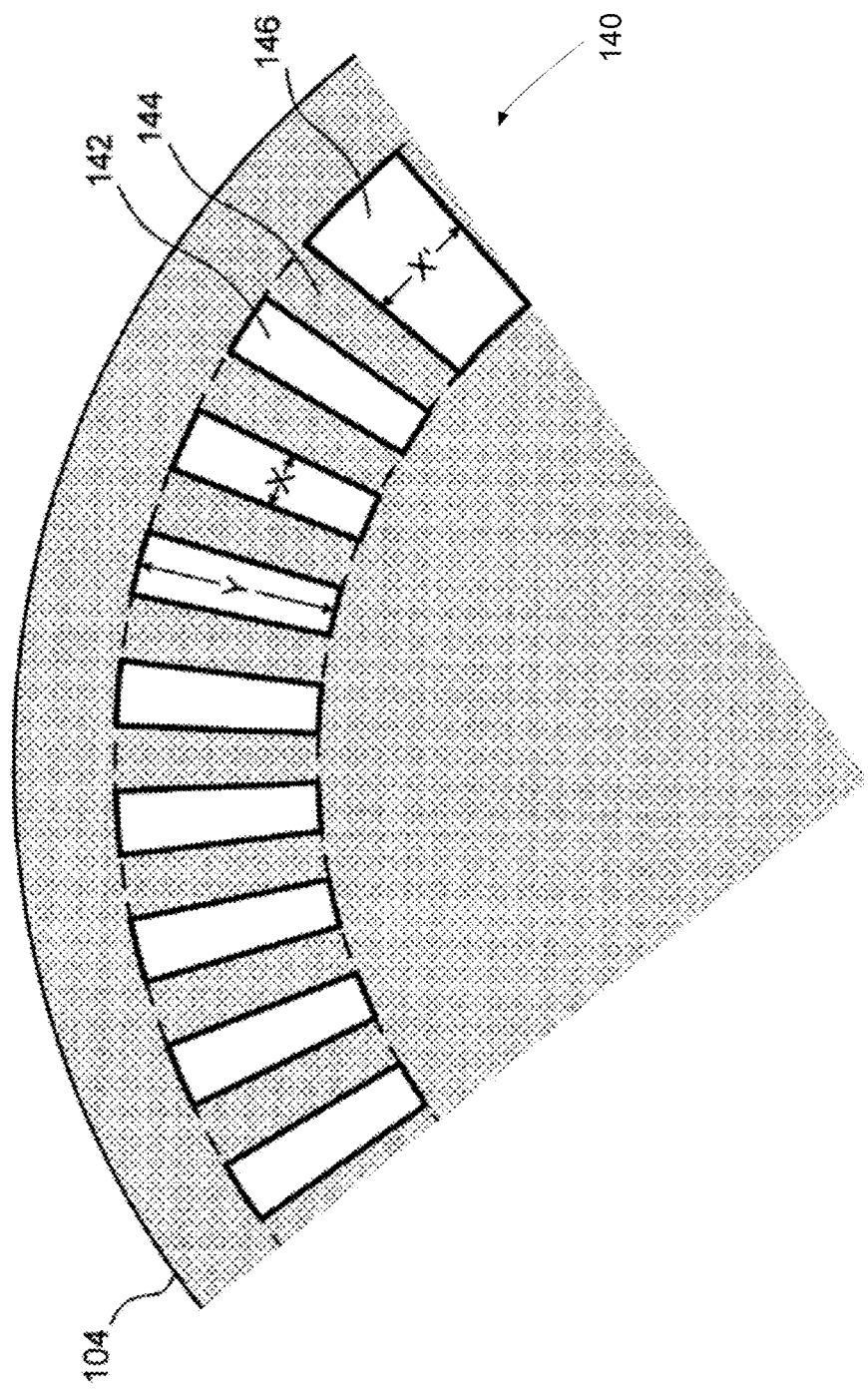
FIG. 2 is a partial schematic diagram of a code wheel.

Although a more detailed illustration of the code wheel 104 is provided in FIG. 2, a brief explanation is provided here as context for the operation of the reflective optical encoding system 100 shown in FIG. 1. In general, the code wheel 104 includes an optical track 140 of non-reflective sections 142 (which may also be referred to as bars 142) and reflective sections 144 (which may also be referred to as windows 144). The optical track 140 may further comprise an index bar 146, which may also be non-reflective but is larger in area than the non-reflective sections 142.

An emitter 120 in the encoder 106 produces light that is incident on the code wheel track 140. As the code wheel 104 is rotated, for example by a motor shaft (not shown), the incident light is not reflected by the non-reflective sections 142, 146 of the track 140, but is reflected by the reflective sections 144 of the track 140. Thus, the light is reflected by the track 140 in a modulated pattern (i.e., on-off-on-off . . . etc.). A detector 130 in the encoder 106 detects the modulated, reflected light signal and, in response, generates one or more periodic channel signals (e.g., $CH_A$ and $CH_B$) as well as an index signal ($CH_I$) when the index section 146 passes over the encoder 106. In one embodiment, these channel signals and index signal are then transmitted to the decoder 108, which generates a count signal and potentially an index signal and transmits the generated signals to the microprocessor 110.

The microprocessor 110 uses the count signal to evaluate the incremental movement of, for example, the motor shaft or other moving part to which the code wheel 104 is coupled. The index signal is used to evaluate complete rotations of the motor shaft or moving part to which the code wheel 104 is coupled. Utilization of incremental signal outputs and an index output enables a more accurate optical encoding system 100 to be achieved.

In some embodiments, the encoder 106 includes the emitter 120 and the detector 130. The emitter 120 includes a light source 122 such as a light-emitting diode (LED). For convenience, the light source 122 is described herein as an LED, although other light sources, or multiple light sources, may be implemented. In one embodiment, the LED 122 is driven by a driver signal, $V_{LED}$, through a current-limiting resistor, $R_L$. The details of such driver circuits are well-known. Some embodiments of the emitter 120 also may include a lens 124 aligned with the LED 122 to direct the projected light in a particular path or pattern. For example, the lens 124 may focus the light onto the code wheel track 140.

In one embodiment, the detector 130 includes one or more photodetectors 132 such as photodiodes. The photodetectors may be implemented, for example, in an integrated circuit (IC). For convenience, the photodetectors 132 are described herein as photodiodes, although other types of photodetectors may be implemented. In one embodiment, the photodiodes 132 are uniquely configured to detect a specific pattern or wavelength of reflected light. Also, the photodiodes 132 may be arranged in a pattern that corresponds to the radius and design of the code wheel 104 or to a code strip as appropriate. The various patterns of photodiodes 132 are referred to herein as photodiode arrays.

The signals produced by the photodiodes 132 are processed by signal processing circuitry 134 which generates the channel signals, $CH_A$, $CH_B$, and $CH_I$. In one embodiment, the detector 130 also includes one or more comparators (not shown) to generate the channel signals and index signal. For example, analog signals from the photodiodes 132 may be converted by the comparators to transistor-transistor logic (TTL) compatible, digital output signals. In one embodiment, these output channel signals may indicate count and direction information for the modulated, reflected light signal. Additionally, the detector 130 may include a lens 136 to direct the reflected light signal toward the photodiodes 132.

Additional details of emitters, detectors, and optical encoders, generally, may be referenced in U.S. Pat. Nos. 4,451,731, 4,691,101, 5,241,172, and 7,400,269, all of which are hereby incorporated herein by reference in their entirety.

Furthermore, although embodiments of the present disclosure are particularly directed toward a reflective optical encoder, it should be appreciated that similar photodiode array and/or code wheel configurations can be utilized in a transmissive optical encoding system without departing from the scope of the present disclosure.

FIG. 2 depicts a partial schematic diagram of one embodiment of a code wheel 104. In particular, FIG. 2 illustrates a portion of a circular code wheel 104 in the shape of a disc. In some embodiments, the code wheel 104 may be in the shape of a ring, rather than a disc or in the shape of a code strip (e.g., for linear encoders). The illustrated code wheel 104 includes a track 140, which may be a circular track that is concentric with the code wheel 104. The track 140 includes a continuous repeating pattern of bars 142 and windows 144 that goes all the way around the code wheel 104 that is interrupted by a single index bar 146. The depicted pattern includes alternating bars 142 and windows 144, with an index bar 146 being located in the position where at least one bar 142 and window 144 would normally be positioned if a true alternating pattern of bars 142 and windows 144 were utilized. In some embodiments, the index bar 146 occupies at least the amount of space that would normally be occupied by two bars 142 and one window 144. In some embodiments, the index bar 146 occurs at least once around the codedisk. When the index bar 146 occurs more than once on a codedisk (or strip), the encoder acts as a pseudo-absolute encoder.

The non-reflective sections 142 and reflective sections 144 can also referred to as position sections. In one embodiment, the non-reflective sections 142 are transparent sections of the code wheel 104 or, alternatively, are voids (e.g., holes) in the code wheel 104. The reflective sections 144 are, for example, opaque sections (which are reflective) in the code wheel 104. In one embodiment, the surface areas corresponding to the reflective sections 144 are coated with a reflective material. In another embodiment, similar to the implementation shown in FIG. 1, the reflective sections 144 of the code wheel 104 may be transparent, with a reflective coating 102 on the opposite side of the code wheel 104. In this embodiment, the non-reflective sections 142 may be opaque so that they absorb the light from the LED 122.

In some embodiments, a transmissive coding element is implemented instead of a reflective coding element. A transmissive coding element such as a code wheel or code strip includes a track 140 of transmissive and non-transmissive sections, rather than reflective and non-reflective sections 144 and 142. In one embodiment, the transmissive coding element is substantially similar to the reflective coding element, except that the transmissive coding element does not include a reflective material 102. In this way, the transparent sections 144 transmit light through the code wheel 104 and the opaque sections 142 do not transmit light through the code wheel 104.

Also, it should be noted that, in some embodiments, the circular code wheel 104 could be replaced with a coding element that is not circular. For example, a linear coding element such as a code strip may be used. Also, an imaging coding element may be used in place of a reflective or transmissive coding element 104.

As described above, rotation of the code wheel 104 and, hence, the track 140 results in modulation of the reflected light signal at the detector 130 to measure position changes of the code wheel 104. Whereas prior art code wheels included a separate index track, embodiments of the present disclosure incorporate the index bar 146 in the optical track 140 to achieve a three-channel encoder that utilizes only a single track 140. This greatly reduces the size and complexity of the encoder 106.

The code wheel 104 depicted in FIG. 2 comprises position track sections 142 and 144 having the same circumferential dimensions (also referred to as the width dimension, as indicated by the span "X"). In other words, the intermediate non-reflective track sections 142 have the same width dimension as the reflective track sections 144. The resolution of the code wheel 104 is a function of the width dimensions of the position track sections 142 and 144. In one embodiment, the width dimensions of the non-reflective track sections 142 are a function of the amount of area required to produce a detectable gap between consecutive, reflected light pulses.

In some embodiments, the index bar 146 has a greater width dimension (as indicated by the span "X'") than the position tracks 142 and 144. In some embodiments, the index bar 146 has a width that is an integral multiple of the width of the position track sections 142 and 144. For example, the index bar 146 may have a width "X'" that is a multiple of 0.5 pitch (P) (e.g., 1.5P, 2.5P, 3.5P, 4.5P, etc.), where P corresponds to the width of a bar 142 or window 144 (e.g., "X"). In other words, the width of the index bar 146 "X'" should be at least one and a half-times larger than "X" and it may be any integer value plus one and a half of "X". Other embodiments may implement different widths for the index bar 146. Additionally, although the depicted code wheel 104 includes a single index bar 146, embodiments of the present disclosure are not so limited. Moreover, although the index bar 146 is depicted as being embodied as a non-reflective section, it should be appreciated that the "index bar" 146 may actually be implemented as a window having dimensions similar to the index bar 146 described herein.

The height "Y" of the optical track 140 may be uniform or non-uniform across the entire code wheel 104. Accordingly, the height "Y" of each bar 142, window 144, and index bar 146 in the optical track 140 may be substantially the same and may be substantially aligned in the same optical track 140 such that the bars 142, windows 144, and index bar 146 all pass over the same photodiodes 132.

Figure 3:
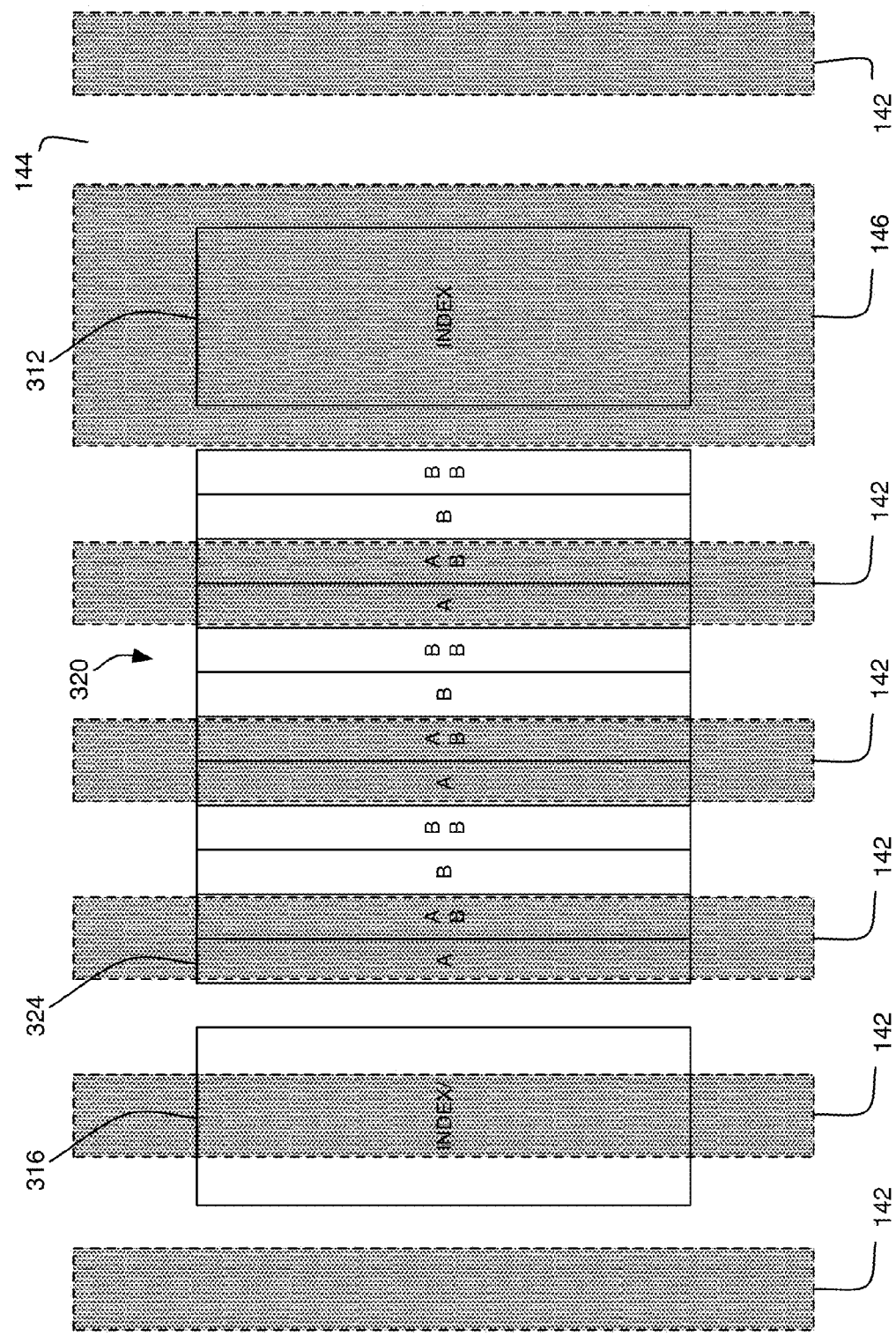
FIG. 3 is a first schematic layout of a photodiode array relative to a code wheel or code strip track.

FIG. 3 depicts a first configuration of photodiodes 132 in a sensor area of the encoder 106, such as is disclosed in U.S. Patent Publication No. 2012/0205528 to Augustyniak et al. Specifically, FIG. 3 depicts a relatively simple implementation of a three-channel encoder using a single optical track 140. The sensor area (e.g., an array of photodiodes 320 and index photodiodes 312, 316) may be aligned relative to the optical track 140 such that the bars 142, windows 144, and index bar 146 all pass over the photodiodes 132 in the sensor area as the code wheel 104 rotates in the direction of array 320 (or in the opposite direction).

The sensor area may comprise an array of incremental photodiodes 320, a first index photodiode 312, and a second index photodiode 316. Although the first index photodiode 312 and second index photodiode 316 are depicted as a single photodiode which covers a certain area in the sensor area, one of ordinary skill in the art will appreciate that the index photodiodes 312, 316 may each be implemented as an array of photodiodes. For ease of discussion, however, the index photodiodes 312, 316 will be referenced as a single photodiode although embodiments of the present disclosure are not so limited. The array of incremental photodiodes 320 and specifically the photodiodes 324 within the array of photodiodes 320 are used to produce output signals $CH_A$ and $CH_B$ (or sine and cosine output signals) whereas the index photodiodes 312, 316 are used to produce output signal $CH_I$.

FIG. 3 also depicts a schematic layout of the sensor area relative to the code wheel track 140. A representation of the code wheel track 140 is overlaid with the sensor area to depict possible dimensions of the individual photodiode array elements with respect to the sections of the code wheel track 140.

The illustrated array of incremental photodiodes 320 includes several individual photodiodes 324, including an A-signal photodiode to generate an A signal, a B-signal photodiode to generate a B signal, an AB-signal photodiode to generate an AB signal, and a BB-signal photodiode to generate a BB signal. For clarification, "AB" is read as "A bar" and "BB" is read as "B bar." This designation of the position photodiodes A, B, AB, and BB and the corresponding electrical signals that are generated by the position photodiodes is well-known in the art. The circumferential dimensions (also referred to as the width dimensions) of the position photodiodes A, B, AB, and BB are related to the width dimensions of the position track sections 142, 144, and 146 of the corresponding code wheel track 140. In the embodiment of FIG. 3, each photodiode A, B, AB, and BB in the array of incremental photodiodes 320 has a width that is one half the width of a bar or window 142 and 144 in the corresponding position track 140 (e.g., width of each photodiode 324 equals "X/2").

Additionally, in the embodiment of FIG. 3, the width of the index bar 146 has a width that is 3× the width of a bar or window 142 and 144. In other words, the width of the index bar 146 equals 3 times "X". This also means that the width of the index bar 146 is about six times the width of a single photodiode 324 in the array of incremental photodiodes 320, but the overall width of the array of four incremental photodiodes 324 is substantially equal to the width of the index bar 146.

Signals from photodiodes can be represented in current or in voltage domain and can be converted from one to the other. Also linear combinations of signals including scaling and summing or subtracting can be implemented. The present disclosure is not limited to any particular physical representation of those signals and, therefore, the signals are treated in an abstract way assuming that, independent on implementation, there exists a way to combine those signals in a linear way and to perform comparisons.

Figure 5C:
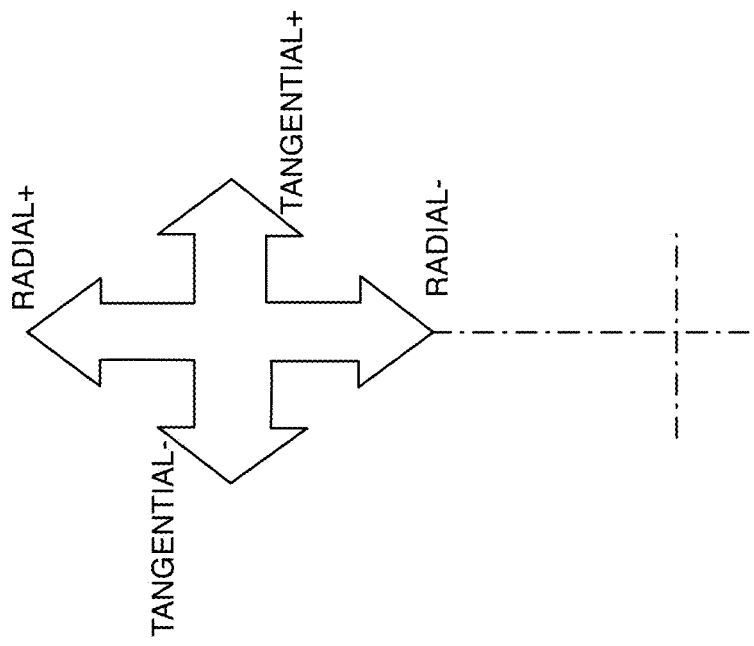
FIG. 5C depicts the possible misalignment directions of an image relative to a photodiode.

It has been discovered that the implementation of FIG. 3 achieves the goal of obtaining a three-channel encoder with a single optical track 140, but presents certain technical obstacles. Specifically, it has been discovered that in a perfectly aligned or nominal position with perfect electrical and optical properties, the image 504 casted from the code wheel pattern is same width as the photodiode, as shown in FIG. 5A. In other words, as long as the code wheel or code strip (collectively or alternatively referred to as a code element) is aligned with the sensor area, the center of the image 504 is the same as a photodiode 508 center. In this example, the Index signal (I) center is at A high center at nominal position as illustrated in FIG. 4A.

Figure 5B:
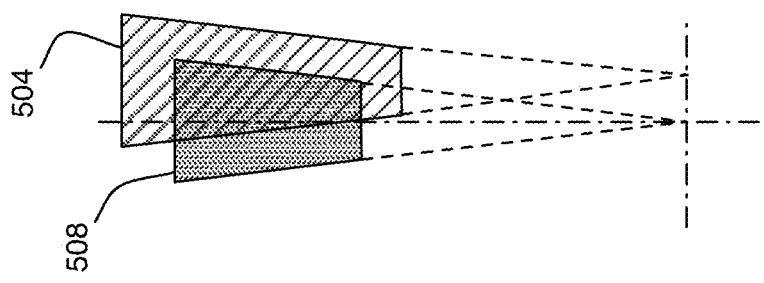
FIG. 5B depicts an image casted over a photodiode during misalignment.
Figure 5A:
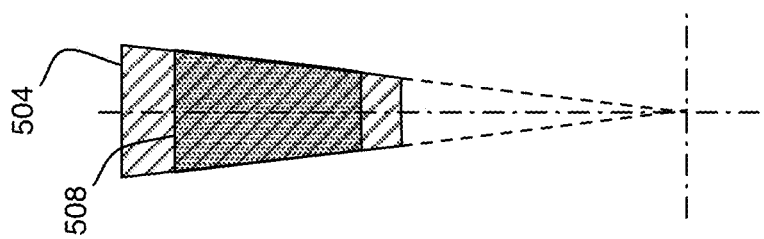
FIG. 5A depicts an image casted over a photodiode during normal alignment.

The imperfection of the encoder assembly process and manufacturing process can cause the position of the photodiode (e.g., IC or detector 130) out from the desired position relative to code wheel pattern, as shown in FIG. 5B. This condition is called misalignment. Misalignment for the code wheel or code strip can be stated in radial and tangential direction from nominal position, as illustrated in FIG. 5C. When misalignment occurs, the index signal (e.g., I signal) tagging referring to a channel signal (e.g., A signal) is offset by an offset amount 404, as shown on FIG. 4B. As misalignment between the code wheel or code strip increases relative to the photodiodes 508, the offset 404 between I signal and A signal increases as shown in FIG. 6B.

In some cases, the raw I signal is gated at different conditions (e.g. A signal high) as shown in FIG. 6A. When the offset 404 is too large, the raw I signal will fulfill multiple regions of the A channel. Essentially, this causes a situation where the I signal is gated multiple times before it should have been. This multiple gating of the I signal can be seen in FIG. 6B and is known to cause functional failure in some encoder applications.

Figure 7:
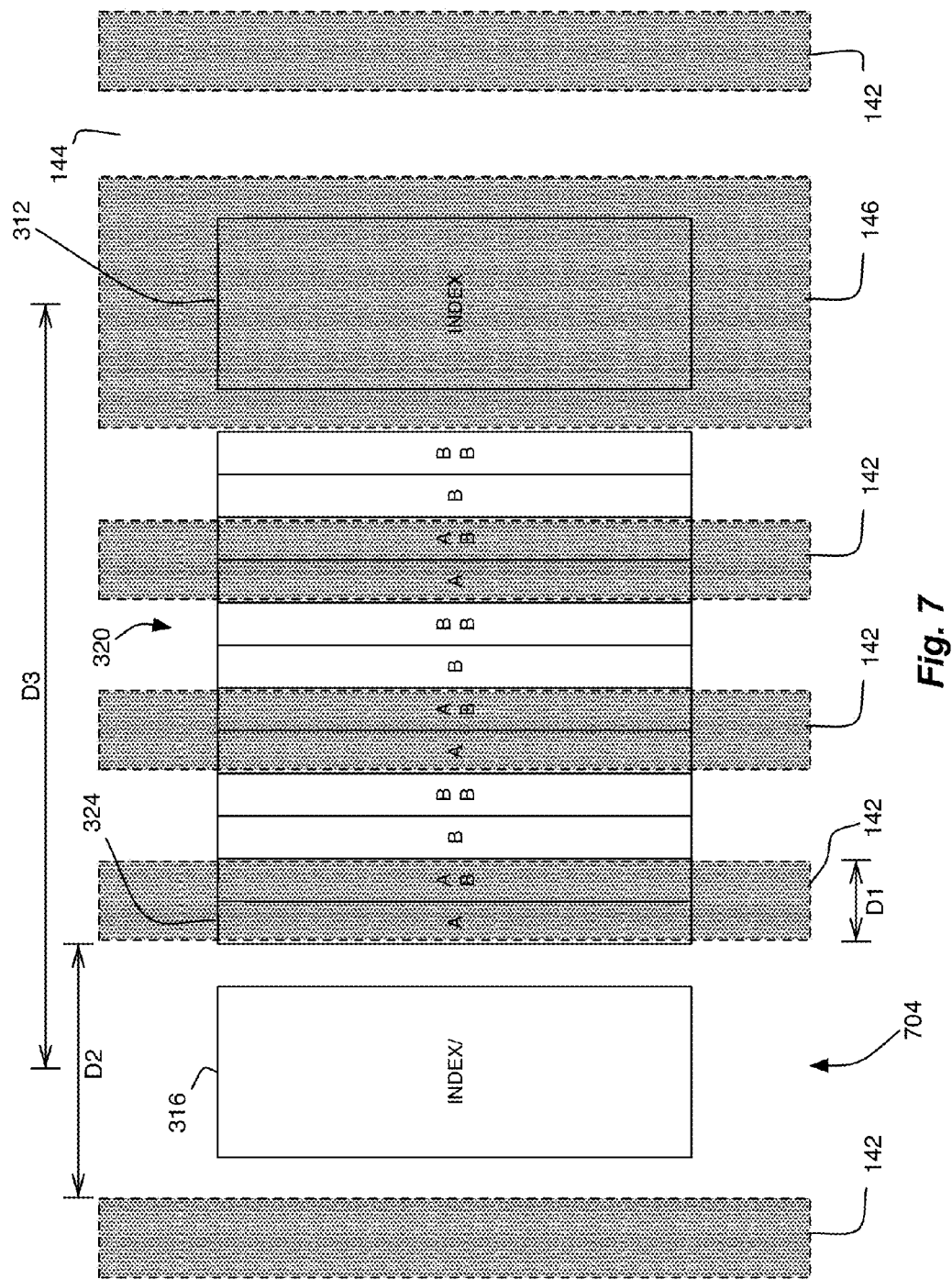
FIG. 7 depicts a schematic layout of a photodiode array relative to a code wheel or code strip track in accordance with embodiments of the present disclosure.

To overcome these above-noted shortcomings, embodiments of the present disclosure propose an improved code wheel or code strip (e.g., code element). One example of such an improved code element is depicted in FIG. 7. Specifically, FIG. 7 shows a code element having an index window 704 that may also be referred to as an additional window.

The index window 704 may be established by removing at least one non-index bar 142 from the optical track 140. In some embodiments, the index window 704 comprises an index window width D2 that is substantially equal to three times a non-index window 144 width or a non-index bar 142 width (e.g., D2 may be greater than or equal to D1×3 or 3X). In some embodiments, the index window width D2 may be substantially equal to the width of the index bar 146 (e.g., D2 may equal "X").

In accordance with at least some embodiments, the index window 704 is offset relative to the index bar 146 by a predetermined distance. As an example, a distance between a center of the index window 704 and index bar 146 D3 may be substantially equal to a distance between a center of the first index photodiode 312 and a center of the second index photodiode 316. By providing an index window 704 of such dimensions and spacing away from the index bar 146, embodiments of the present disclosure are able to overcome the misalignment issues discussed above. Specifically, the index window 704 can be used to generate an additional index signal ("I/" as opposed to the original index signal "I" that is generated away from the additional window). The processing of both I and I/ (e.g., according to the following equation [I−(I/)]) affords the generation of a differential index signal which is less sensitive to a misaligned code wheel or code strip. More specifically, the output from the second index photodiode 316 can be subtracted from the output from the first index photodiode 312 to generate a single index output.

For radial misalignment of approximately −0.35 mm in above example, the Index position is shifted 90e for embodiments without the index window 704 whereas embodiments comprising an index window 704 shift the Index position by no more than 2e.

For spatial comparison in tangential direction of approximately, 0.35 mm, Index position is shifted 34e for embodiments without the index window 704 whereas embodiments comprising an index window 704 shift the Index position by no more 5e.

As can be seen, three-channel optical encoders having all three channels on a single optical track are somewhat sensitive to misalignment and spatial movement. This sensitivity could lead to functional problems in application as multiple gated Index conditions can be triggered.

According to embodiments of the present disclosure, when a code element is equipped with an index window 704, the digital signal for Index (signal generated by the differential of analog signal for Index and Index/) is almost centered to the center of the A signal (e.g., offset 404 is substantially negligible) in both radial (e.g., −0.35 mm) and tangential (e.g., +0.35 mm) misalignment positions. In other words, with a differential index design, embodiments of the present disclosure are capable of providing an I signal center position versus A/B signal that is less sensitive to radial and tangential misalignment of the code element.

Figure 8:
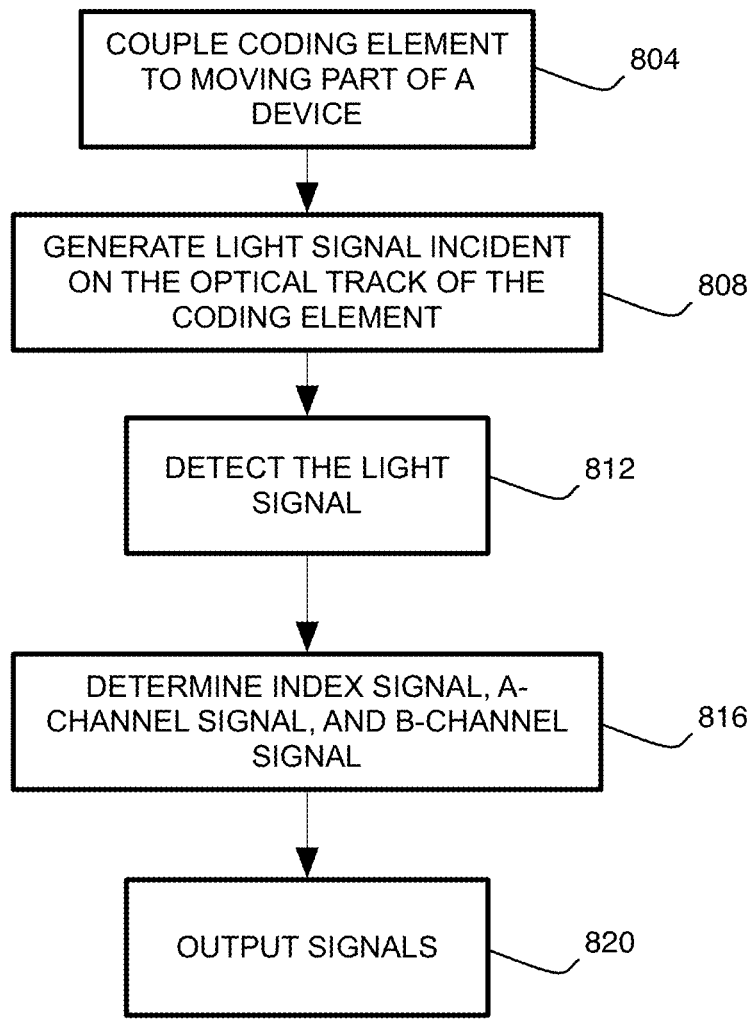
FIG. 8 is a flow diagram depicting a method operating a three-channel encoder in accordance with embodiments of the present disclosure.

With reference now to FIG. 8, a method of operating an encoder as disclosed herein will be described in accordance with embodiments of the present disclosure. The method begins when a coding element (e.g., code wheel or code strip) is coupled to a moving part of a device or system (step 804). Thereafter, light is generated by a light source 122 and the generated light is directed toward the optical track 140 of the coding element (step 808).

Depending upon whether the coding element is reflective or transmissive, the light incident on the coding element is either reflected by the reflective sections of the coding element or allowed to pass through the window sections of the coding element. The light that reflected and passed through the coding element is then detected at the detector 130 (step 812). Specifically, the light may be detected at one or more of the incremental photodiodes 324, the first index photodiode 312, and the second index photodiode 316, depending upon the position of the coding element relative to the photodiodes.

Based on the detected light signal, the signal processing circuitry 134, decoder 108, and/or micro-processor 110 determine an index signal, A-channel signal, and B-channel signal (step 816) and these three signals are output by the encoder (step 820). As discussed above, the index signal may be generated using a differential of the outputs from the first index photodiode 312 and second index photodiode 316.

While a number of potential modifications to the optical track 140 and sensor area have been discussed herein, it should be appreciated that combinations of the potential modifications can also be implemented without departing from the scope of the present disclosure. Therefore, any optical encoding system 100 incorporating one or more of the features of the optical track 140 and/or sensor area described herein falls within the scope of the present disclosure. For example, the heights of the various incremental photodiodes 324 can be adjusted to reduce noise and other unwanted conditions.

Additionally, the dimensions of the sensor area and the photodiodes therein may vary depending upon the application in which the optical encoder system 100 is employed. As one non-limiting example, the height of the sensor area may be on the order of about 300 to 400 micrometers. The length of the sensor area can be on the order of about 1200 micrometers. The width of each A, B, AB, and BB photodiode may be on the order of about 40 micrometers. The width of the index photodiodes 312, 316 may be on the order of about 160 micrometers. As can be appreciated, however, the sizes of the components described herein can vary to accommodate any number of applications.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. An encoder for use in an optical encoding system, comprising:
   an emitter configured to emit light;
   a detector configured to receive at least a portion of the light emitted by the emitter and convert the received light into one or more electrical signals which are used to generate three output signals, wherein the light used to generate the three output signals at least one of passed through and was reflected by a single optical track of a coding element, wherein one of the three output signals comprises a differential index signal, and wherein the single optical track comprises an index bar, an index window, and at least one non-index bar that separates the index bar from the index window, wherein the detector comprises a sensor area that includes an array of incremental photodiodes, a first index photodiode that generates a first index output, and a second index photodiode that generates a second index output, the second index output being subtracted from the first index output to generate the differential index signal.

2. The encoder of claim 1, wherein the array of incremental photodiodes are arranged between the first index photodiode and the second index photodiode.

3. The encoder of claim 2, wherein the first index photodiode comprises a width that is at least four times larger than a width of an incremental photodiode in the array of index photodiodes.

4. The encoder of claim 3, wherein the second index photodiode comprises a width that is substantially equal to the width of the first index photodiode.

5. The encoder of claim 1, wherein a distance between a center of the index window and a center of the index bar substantially equals a distance between a center of the first index photodiode and a center of the second index photodiode.

6. The encoder of claim 1, wherein the single optical track is at least one of radially and linearly-oriented.

7. A system for translating physical motion of a device into an electrical signal, the system comprising:
   an encoder comprising:
      a sensor area that includes an array of incremental photodiodes, a first index photodiode, and a second index photodiode;
      a coding element having a single optical track that includes an index bar, an index window, and at least one non-index bar, the coding element being mechanically coupled to the device, the single optical track being positioned in proximity to the sensor area; and
   signal processing circuitry coupled to the sensor area and being configured to output at least three output signals, at least one of the three output signals corresponding to an index signal that is generated based on inputs received from the first index photodiode and the second photodiode, wherein the index signal is generated by subtracting an input received from the second index photodiode from an input received from the first index photodiode.

8. The system of claim 7, wherein the index signal is generated when the index window overlies the second index photodiode and the index bar overlies the first index photodiode.

9. The system of claim 7, wherein a distance between a center of the index window and a center of the index bar substantially equals a distance between a center of the first index photodiode and a center of the second index photodiode.

10. The system of claim 7, wherein the array of incremental photodiodes include an A-signal photodiode, a B-signal photodiode, an AB-signal photodiode, and a BB-signal photodiode.

11. The system of claim 10, wherein the array of incremental photodiodes are used to produce an A-channel output signal and a B-channel output signal.

12. A system for translating physical motion of a device into an electrical signal, the system comprising:
   an encoder comprising:
      a sensor area that includes an array of incremental photodiodes, a first index photodiode, and a second index photodiode;
      a coding element having a single optical track that includes an index bar, an index window, and at least one non-index bar, the coding element being mechanically coupled to the device, the single optical track being positioned in proximity to the sensor area, wherein the single optical track comprises an index bar, an index window, and at least one non-index bar that separates the index bar from the index window; and
   signal processing circuitry coupled to the sensor area and being configured to output at least three output signals, at least one of the three output signals corresponding to an index signal that is generated based on inputs received from the first index photodiode and the second photodiode, wherein the index signal is generated by subtracting an input received from the second index photodiode from an input received from the first index photodiode.

13. The system of claim 12, wherein the index signal is generated when the index window overlies the second index photodiode and the index bar overlies the first index photodiode.

14. The system of claim 12, wherein a distance between a center of the index window and a center of the index bar substantially equals a distance between a center of the first index photodiode and a center of the second index photodiode.

15. The system of claim 12, wherein the array of incremental photodiodes include an A-signal photodiode, a B-signal photodiode, an AB-signal photodiode, and a BB-signal photodiode.

16. The system of claim 15, wherein the array of incremental photodiodes are used to produce an A-channel output signal and a B-channel output signal.

17. The system of claim 12, wherein the single optical track is radially oriented.

18. The system of claim 12, wherein the single optical track is linearly oriented.

* * * * *